Nov. 18, 1952  H. J. WRIGHT ET AL  2,618,659
PREPARATION OF GLYCERYL AMINES
Filed Dec. 21, 1946
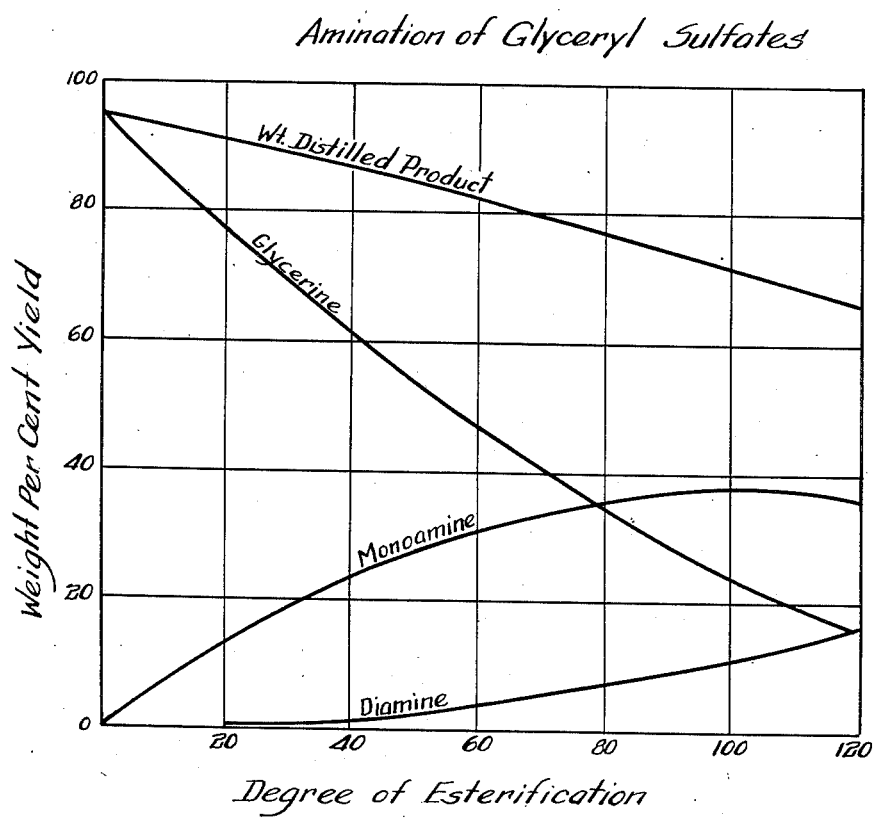
INVENTORS.
Howard J. Wright
Archie B. Cramer
By: Moore, Olson & Trexler
Attys.

Patented Nov. 18, 1952

2,618,659

UNITED STATES PATENT OFFICE 2,618,659

PREPARATION OF GLYCERYL AMINES

Howard J. Wright, Evanston, and Archie B. Cramer, Chicago, Ill., assignors to The Association of American Soap & Glycerine Producers, Inc., New York, N. Y., a corporation of Delaware Application December 21, 1946, Serial No. 717,650

3 Claims. (Cl. 260—584)

This invention relates to the preparation of glyceryl amines. More particularly it relates to a method for making glyceryl amines from glycerine and to the product obtained.

In this specification, the term "glyceryl amine" is applied only to the compound 3-amino-1, 2-propanediol and the term "glyceryl diamine" is applied only to the compound 2-hydroxy-1, 3-diamino-propane. The term "glyceryl amines" includes both of these compounds.

The technical and patent literature describes the preparation of glyceryl amines from glycerine by various procedures in which such intermediates as glycidol, epichlorohydrin, glyceryl monochlorohydrin, and glyceryl dichlorohydrin are formed. Because of the intermediates involved, these procedures suffer from the following objections: high cost, corrosiveness to metals, necessity to use a large excess of expensive and corrosive HCl in the process, and necessity for isolation of the intermediate in a relatively pure state before conversion to amines.

It is an object of this invention to provide an improved process for preparing glyceryl amines from glycerine.

Further objects are to provide a composition containing glyceryl amines which is useful as such in the manufacture of alkyd resins and to provide a process for making such a composition from glycerine.

Other objects will appear hereinafter.

It has now been found that the foregoing objects are accomplished by the following process. Glycerine is treated with a sulfating agent, preferably at approximately room temperature. The esterification reaction which ensues gives a mixture probably comprising glyceryl hydrogen sulfate, glyceryl bis (hydrogen sulfate), glyceryl tris (hydrogen sulfate), diglyceryl sulfates and/or unreacted glycerine, the proportions of which depend on the reaction conditions. The sulfating agent may be any acidic derivative of hexavalent sulfur capable of esterifying alcohols, such as concentrated sulfuric acid, chlorosulfonic acid, sulfur trioxide, sulfuryl chloride, or mixtures of these. A preferred sulfating agent is sulfuric acid which titrates over 100% H₂SO₄, probably because the excess SO₃ keeps the reaction mixture more nearly anhydrous and thus tends to drive the esterification reaction to completion. The mixture obtained from the esterification reaction is treated with ammonia to form glyceryl amines. Preferably, the mixture is neutralized prior to the amination reaction and the latter reaction is preferably carried out in the presence of a fixed alkali and in the presence of at least three pounds of water per pound of glycerine originally treated. A mixture of glycerine and glyceryl amines may be recovered from the mixture resulting from the amination reaction by evaporating off water and any residual ammonia, eliminating any inorganic sulfates present to a sufficient extent to avoid fouling in the still pot and then distilling off the mixture of glycerine and glyceryl amines.

The theoretical equation for the formation of glyceryl hydrogen sulfate using sulfuric acid is as follows:

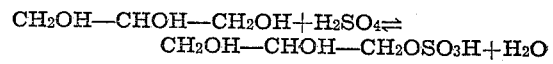

Since the sulfation reaction results in practice in a mixture of products, calculations are simplified by calculating the amount of ester in the product as the equivalent amount of glyceryl hydrogen sulfate. In this connection an abbreviation, "D. E.," meaning degree of esterification, is used herein. "D. E." is defined as the apparent average number (times 100) of hydrogen sulfate groups per glycerine molecule. The D. E. can be determined simply by titration of the reaction mixture with alkali, the difference between original acid groups in the sulfuric acid and residual acid groups giving a measure of the number of hydrogen sulfate linkages in the product.

An equation for a typical amination reaction is presumably as follows:

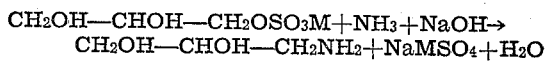

where M is an alkali or alkaline earth metal or ammonia.

The following example describes in detail a procedure in accordance with this inventiton. It is to be understood that this example is intended to be construed as illustrative only and not as limiting the scope of the invention.

*Example*

High gravity glycerine (1,000 pounds) is placed in a water-jacketed container of about 200 gallons capacity provided with an efficient stirrer. Sulfuric acid (756 pounds of 104% H₂SO₄ content; 15% oleum) is then added in small streams while maintaining the temperature below about 86° F. The D. E. of this product is about 60.

This glycerine-sulfuric acid product is neutralized by mixing with caustic soda solution in a second container of about 1,000 gallons capacity, also water-jacketed and provided with a stirrer. A caustic soda solution of 20% concentration is used. The glycerine-sulfuric acid product and the caustic solution are allowed to flow into the tank in small streams, care being taken to maintain slightly acid conditions until the end of the mixing. The temperature should not exceed 80° F. Three hundred eighty-two pounds of caustic soda (100% basis) are required to make a neutral sodium glyceryl sulfate solution. Before aminating this neutralized product water is added to make up the volume to 720 gallons.

Amination of the sodium glyceryl sulfate solution is carried out in an autoclave. For the 720 gallon batch of sodium glyceryl sulfate described above, an autoclave is charged with 1,000 gallons of cencentrated aqueous ammonia and about 70 gallons of a 32% caustic soda solution (containing 260 lbs. caustic, 100% basis). The autoclave and the contents are then heated to 250° F. The sodium glyceryl sulfate is pumped slowly into the autoclave. When all of the solution has been added, the pressure (at 250° F.) is about 90–100 lbs./sq. in. gage and the total liquid volume is about 1,800 gals. Heating for about ½ hour longer drives the reaction nearer to completion.

Following this ½ hour of heating, some of the ammonia is discharged from the autoclave and condensed in a cold pressure vessel. The contents of the autoclave are then removed and water and any residual ammonia boiled off, leaving a thick slurry of glycerine, amines, water and sodium sulfate. The amine-glycerine-water-salt mixture is carried to 120° C., and then centrifuged to remove sodium sulfate. This procedure eliminates enough of the sodium sulfate so that a distillation can be made without excessive fouling of the still pot.

The distillation is carried out under good vacuum of about 3 mm. absolute pressure. A glycerine still is used since the amines boil just below glycerine, and there is unreacted glycerine in the product. The distillable product (from 1,000 lbs. of glycerine) distills over between about 115° C. and about 160° C., weighs abou 820 pounds and contains 40 pounds of glyceryl diamine, 310 pounds of glyceryl monoamine, and 470 pounds of glycerine. A non-volatile organic residue containing substantial quantities of polyglycerols and high glyceryl amines and weighing about 120 pounds remains.

In the accompanying drawing, which forms a part of this specification, there is a diagram which shows in form of curves the yields of monoamine, diamine, glycerine, and total distillable product as related to the D. E. of the sulfated glycerine used. The various curves and lines of the diagram are described by suitable legends on the drawing. The yields shown in this diagram were obtained under reaction conditions approximately the same as those given in the example.

The above described esterification procedure can be varied widely within the scope of the invention but is preferably carried out so that the D. E. of the product is in the range from about 20 to about 130. Where the D. E. is below 20, the yield in the esterification is undesirably low and there is a large amount of glycerine that has to be carried through the process unreacted. On the other hand, when the esterification is conducted to form a product having a D. E. above about 130, a side reaction in which glyceryl disulfate is formed becomes a large factor and as a result, the amount of material lost as residue in the distillation becomes undesirably large. The conversion of disulfate to amine is very low. The amount of sulfating agent used in the above example may be varied to increase or decrease the D. E. of the product, and in the light of the above example, those skilled in the art will be able to select a quantity of sulfating agent which will yield a product having the desired D. E.

Too high a temperature in the sulfation reaction causes undesirable side reactions to take place and since this reaction is exothermic in character, the problem is one of removing rather than adding heat. As indicated above, it is preferable to maintain the reaction mass at approximately room temperature or below about 86° F. during the esterification in order to minimize the undesirable side reactions. The esterification can be carried out at temperatures below room temperature or higher than 86° F., however, within the scope of the invention.

For the same purpose of minimizing side reactions, the sulfating agent is so added as to avoid any local high concentrations. The usual means, such as efficient stirring and slow addition in small streams are effective for this purpose. Otherwise, the sulfating agent may be added as desired. Except as it may cause evolution of heat more rapidly than it can be carried away or may produce undesirable local high concentrations, the speed with which the sulfating agent is added is not a factor in the result. Moreover, the reaction takes place rapidly once the sulfating agent is introduced into the mixture and it has been observed that allowing the mixture to stand for from one to four hours following completion of the addition of the sulfating agent does not produce any great change in the product.

While it is preferable to neutralize the mass obtained from the esterification reaction before treating with ammonia, it is within the scope of the invention to permit the neutralization to take place at the same time the treatment with ammonia is carried out. This procedure is not preferred because much better yields are obtained by neutralizing prior to the treatment with ammonia, preferably with a fixed alkali. It is also preferable to use a fixed alkali to neutralize the glyceryl hydrogen sulfate even when the neutralization is accomplished simultaneously with the treatment with ammonia. It is within the scope of the invention, however, to neutralize the sulfation product prior to or during treatment with ammonia by converting it into an alkaline, alkaline earth, magnesium, or ammonium salt, for example. Where caustic soda is used to neutralize the sulfation product, it has been found that solutions ranging from about 10 to 20 per cent concentration are quite satisfactory, although other concentrations can be used if desired. Equivalent concentrations of the other alkaline materials are preferred.

In general, the neutralization of the sulfation product may be carried out in any desired way, although, as indicated in the above example, it is desirable to maintain slightly acid conditions at all times until the end of the mixing and to avoid high temperature. In addition to this, it is also desirable to bring the reactants together in such a way that local high concentrations are avoided. Alkaline conditions during the neutralization cause saponification of the sulfate to occur. Where neutralization is accomplished in the amination vessel by adding the acidic sulfating mixture to a mixture of ammonia and fixed alkali, the heat produced in the neutralization of acid groups may be used to raise the temperature of the reaction mixture and thereby increase the rate of amination.

In accordance with the preferred procedure, however, as set out in the above example, the sulfation product is neutralized with a fixed alkali, and water is added prior to the amination step. The amount of water present in the example is near the optimum although a substantial increase or decrease in this amount still permits acceptable yields. The preferred range of amounts of water in the mixture undergoing amination is from about three to about thirty pounds of water per pound of glycerine used. If the mixture is too concentrated during amination, a noticeable decrease in yield results.

The procedure during amination may also be varied. Thus, it has been found that the reactants in the amination step may be added all at once instead of pumping the neutral glyceryl sulfate solution into the hot aqueous ammonia. In this variation, the maximum pressure attained is lower than that attained in the example. It has also been found that a fair yield of amines can be obtained by mixing the glyceryl sulfate salt and aqueous ammonia and heating at atmospheric pressure until the unreacted ammonia has all been driven off. Thus, the range of useful pressures is of the order of 0 to 250 pounds per square inch gauge. Elevated pressures of the order of 75 to 250 pounds per square inch gauge are preferred, however. The maximum temperature in the amination may be 150° C. or higher in pressure vessels and the minimum approximately room temperature. The reaction is slow at the lower temperature, however. On the other hand, higher temperatures result in higher maximum pressures in the autoclave.

The amount of ammonia used has some effect on the results since unless a substantial excess is present, there is a tendency to form secondary and tertiary amines. However, too great an excess is uneconomical. A useful range has been found to be from about 5 to about 50 mols of ammonia per sulfate linkage. While the invention has been described above with particular reference to ammonia, it is within the scope of the invention to substitute various amines for the ammonia in whole or in part in the amination reaction. In this connection, it is to be noted, however, that for resin formation as is described hereinafter, a primary amine is necessary.

The presence of a quantity of a fixed alkali (i. e., an alkali that does not distill off from aqueous solutions, such as those alkalis listed below) greater than is required for neutralization of acid groups, is definitely preferred during amination, since it very markedly increases the yield of amines. The amination can be carried out, however, in the presence of from 0 to 2 or more equivalents of fixed alkali per ester linkage in addition to any required for neutralization of the acid groups in the sulfated product. By way of further illustration, such fixed alkali can be sodium carbonate, potassium carbonate, calcium hydroxide, sodium or potassium bicarbonate or other equivalent alkaline material as well as sodium hydroxide as used in the above example. Amination proceeds very rapidly so that it is not necessary to let the amination mixture stand for any substantial length of time after all the reactants are added in order to attain a high yield. Heating at the elevated temperature following the addition of all the reactants as in the example, does, however, tend to drive the reaction nearer to completion and thus increases the yield.

It is not necessary that the reactants be isolated following amination in the precise manner described in the example. Thus the reaction mixture may be kept in the autoclave until all of the ammonia is discharged and condensed in the cold pressure vessel. Also, if the slurry becomes too thick, during the concentration, the sodium sulfate can be removed by centrifuging before the concentration is completed. This may happen when the proportion of sulfating agent to glycerine in the sulfating step is higher than in the above example. While the glycerine and glyceryl amines can be readily separated from the other materials present in the final reaction mass, the physical similarities between glycerine and glyceryl amines, particularly the monoamine, make it very difficult to separate these latter materials by fractional distillation or by any other means. Fortunately, however, it is not necessary to make a separation of these materials because the mixture of glycerine and glyceryl amines in the proportions in which they occur, in the product produced according to the preferred conditions of reaction, has an important industrial use as such. This use is in the formation of alkyd resins which are among the most important synthetic resins industrially.

One of the basic constituents of alkyd resins is glycerine. A very useful additional component in alkyd formulations is glyceryl amine, and it has been found that the ratio of glyceryl amines to glycerine in the products produced by the process described herein is high enough to make this mixture valuable in alkyd formulations. For example, a superior alkyd resin can be produced by heating 112.7 parts, by weight, of phthalic anhydride, 30.2 parts, by weight, glycerine, 60 parts, by weight, soya bean oil, and 22.5 parts, by weight, of a mixture of glycerine and glyceryl amines as produced according to the process described in the above example. Heating is continued until the resin has polymerized almost to the gel stage and the product is then diluted with a cold solvent, such as xylene. The resin so produced has value in varnishes and enamels for coating automobiles, trucks, railroad cars, farm implements, stoves, refrigerators, washing machines, and the like, and gives a harder and faster drying finish than ordinary alkyds not modified with glyceryl amines.

Many of the advantages of the invention will be apparent from the foregoing description. Outstanding among these advantages are that the process described is cheap, simple to carry out, rapid and relatively non-corrosive. Further advantages are that in accordance with this process, glyceryl amines are made from inexpensive and readily available chemicals, such as glycerine, caustic soda, ammonia, sulfuric acid, and water. A further and outstanding advantage of the invention is that the process produces as the final product, a mixture of glycerine and glyceryl amines in proportions such that the mixture may be used without separation of glycerine and glyceryl amines in the manufacture of new and valuable alkyd resins.

It is apparent that many widely different embodiments of this invention may be made without departing from the spirit and scope thereof and therefore it is not intended to be limited except as indicated in the appended claims.

This invention is hereby claimed as follows:

1. A process of preparing glyceryl monoamine which comprises treating glycerine with a sulfating agent to produce reaction products having an apparent average number of hydrogen sulfate groups per glycerine molecule of from about 0.20 to about 1.30 and aminating the reaction products by treatment with about 5 to about 50 moles of ammonia per mole of sulfate ester groups in the presence of an amount of a fixed alkali which is in excess of one equivalent for each acid equivalent in the sulfating agent used and in the presence of a weight of water which is about 3 to about 30 times the weight of glycerine originally treated, at a pressure in the range from about 0 to about 250 lbs./sq. in. gage and a temperature in the range from about 40° C. to about 150° C. and recovering the glycerine:glyceryl amines mixture.

2. A process of preparing glyceryl monoamine from glycerine which comprises sulfating glycerine to produce reaction products having an apparent average number of hydrogen sulfate groups per glycerine molecule of about 0.60, aminating the neutralized sulfation product by treatment at a temperature of about 110° C. and a pressure of about 75 lbs./sq. in. with about 5 to about 50 moles of ammonia per mole of sulfate ester groups in a weight of water which is about 3 to about 30 times the weight of glycerine originally treated and initially containing more than one mole of caustic soda for each ester linkage, and recovering the glycerine:glyceryl amines mixture formed.

3. A process of preparing glyceryl monoamine which comprises treating glycerine with concentrated sulfuric acid sufficient to give a reaction product having an apparent average number of hydrogen sulfate groups per glycerine molecule of from about 0.20 to about 1.30 at a temperature below 100° F., and aminating the reaction products by treatment with about 5 to about 50 moles of ammonia per mole of sulfate ester groups in the presence of an amount of a fixed alkali which is in excess of one equivalent for each acid equivalent of sulfuric acid and in the presence of a weight of water which is about 3 to about 30 times the weight of glycerine originally treated, at a pressure in the range from about 0 to about 250 lbs./sq. in. gage and a temperature in the range from about 40° C. to about 150° C. and recovering the glycerine:glyceryl amines mixture.

HOWARD J. WRIGHT.
ARCHIE B. CRAMER.

REFERENCES CITED

The following references are of record in the file of this patent:

UNITED STATES PATENTS

| Number    | Name         | Date          |
|-----------|--------------|---------------|
| 2,042,621 | Olin         | June 2, 1936  |
| 2,064,797 | Holsten      | Dec. 15, 1936 |
| 2,065,113 | Bottoms      | Dec. 22, 1936 |
| 2,114,256 | Schenck      | Apr. 12, 1938 |
| 2,215,038 | Hodgins et al. | Sept. 17, 1940 |

FOREIGN PATENTS

| Number  | Country       | Date          |
|---------|---------------|---------------|
| 376,929 | Great Britain | July 21, 1932 |

OTHER REFERENCES

Degering: "Org. Nitrogens Compounds," p. 202 (para. 598), (University Lithoprinters, Ypsilanti, Mich. 1945).